(12) United States Patent
Berstis et al.

(10) Patent No.: US 7,188,240 B1
(45) Date of Patent: Mar. 6, 2007

(54) METHOD AND SYSTEM FOR ENCRYPTION OF WEB BROWSER CACHE

(75) Inventors: Viktors Berstis, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,974

(22) Filed: Jul. 15, 1999

(51) Int. Cl.
*G06F 9/46* (2006.01)
*G06F 11/30* (2006.01)
*G06F 15/177* (2006.01)
*H04L 9/00* (2006.01)

(52) U.S. Cl. ............... 713/100; 713/150; 713/189; 709/222

(58) Field of Classification Search .......... 713/100, 713/150–194, 201; 711/3; 709/200, 213, 709/222; 718/100–108
See application file for complete search history.

(56) References Cited

U.S. PATENT DOCUMENTS

| | | | | |
|---|---|---|---|---|
| 4,847,758 A | * | 7/1989 | Olson et al. .............. 711/133 |
| 5,689,638 A | * | 11/1997 | Sadovsky .................. 713/202 |
| 5,694,546 A | | 12/1997 | Reisman ................... 395/200 |
| 5,809,145 A | | 9/1998 | Slik et al. .................. 380/25 |
| 5,892,825 A | * | 4/1999 | Mages et al. ............... 705/51 |
| 5,903,881 A | * | 5/1999 | Schrader et al. ............ 705/42 |
| 5,923,756 A | * | 7/1999 | Shambroom ............... 713/156 |
| 5,931,904 A | * | 8/1999 | Banga et al. ............... 709/217 |
| 5,963,884 A | * | 10/1999 | Billington et al. ........... 702/56 |
| 6,104,392 A | * | 8/2000 | Shaw et al. ................. 345/749 |
| 6,105,012 A | * | 8/2000 | Chang et al. ................ 705/64 |
| 6,151,676 A | * | 11/2000 | Cuccia et al. ............... 713/176 |
| 6,233,606 B1 | * | 5/2001 | Dujari ...................... 709/213 |
| 6,370,614 B1 | * | 4/2002 | Teoman et al. ............. 711/113 |
| 6,453,334 B1 | * | 9/2002 | Vinson et al. .............. 709/203 |
| 6,453,342 B1 | * | 9/2002 | Himmel et al. ............. 709/213 |
| 6,510,458 B1 | * | 1/2003 | Berstis et al. .............. 709/219 |
| 6,661,904 B1 | * | 12/2003 | Sasich et al. .............. 382/100 |

(Continued)

OTHER PUBLICATIONS

Newton's Telecom Dictionary, Oct. 1998, Telecom Books, p. 423.*

(Continued)

*Primary Examiner*—Meng-Al T. An
*Assistant Examiner*—Jennifer N. To
(74) *Attorney, Agent, or Firm*—Duke W. Yee; Jeffrey S. LaBaw; Gerald H. Glanzman

(57) ABSTRACT

A user normally logs on to a distributed network, such as the user's Internet service, using the user's unique login name and password. The user must then be authorized to write to and read from encrypted information stored in the browser defined cache. The browser cache may be defined as either system memory or disk memory. The user might be required to enter a second password. Information requested by the user is then encrypted, either as a browser function or as an application function of the memory portion defined by the browser. Once authorized by the browser, the user can both read and write to the encrypted information in the cache. Thus, as the user browses network nodes or web pages on a network, the pages are encrypted by the browser before they are cached. Information requested by the user and stored in the cache is first decrypted by the browser and then displayed by the browser.

22 Claims, 7 Drawing Sheets

U.S. PATENT DOCUMENTS 6,941,454 B1 *   9/2005   Spraggs ...................... 713/150

OTHER PUBLICATIONS

Heusen, "Netscape security problem with cache files", "comp.security.misc", Jul. 16, 1996.*

Jamil, "Re: Wish-Make Offline Browsing More Convenience""netscape.public.mozzilla.wishlist", Apr. 1, 1998.*

Fagard, "Copyright in HTML 3?".*

Rick, "About BC WIPE", "alt.privacy.anon-server", Dec. 20, 1998.*

Baentsch et al., "Worl-Wide Web Caching—The application level view of the internet", IEEE communications magazines, vol. 35, No. 6, Jun. 1997, pp. 170-178.*

Simpson, "Announce—ScramDisk—Free Windows 95/98 hard Disk Encryption Program", "sci.crypt", Jul. 14, 1998.*

Anti-cult "Cache Directories—delete them sometimes"- "alt.religion.scientology", Jan. 30, 1997.*

Kesinger "Two very simple solution", "comp.infosystems.www.authoring.html", Oct. 26, 1995.*

Davis "Sharing Netscape cache?", "comp.unix.admin", Jun. 4, 1997.*

Zhao, "A WWW Service to Embed and Prove Digital Copyright Watermarks", European Conference on Multimedia Applications, Services and Teachniques, Belgium, 1996, pp. 1-15.*

* cited by examiner

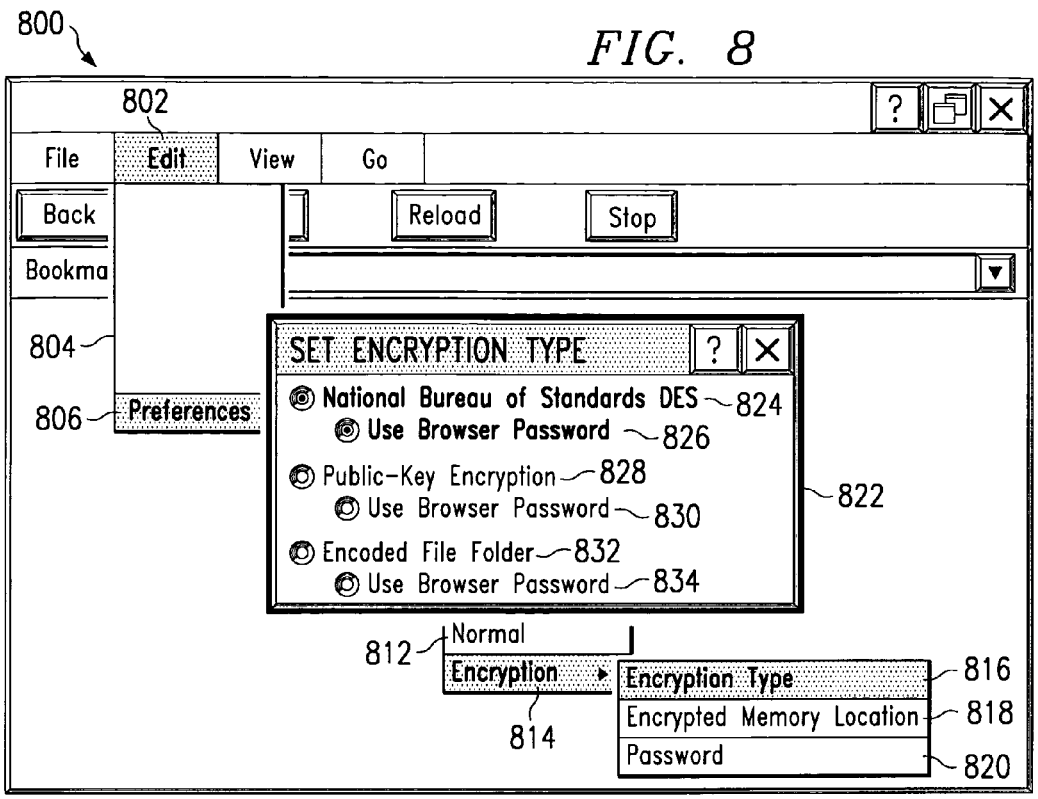
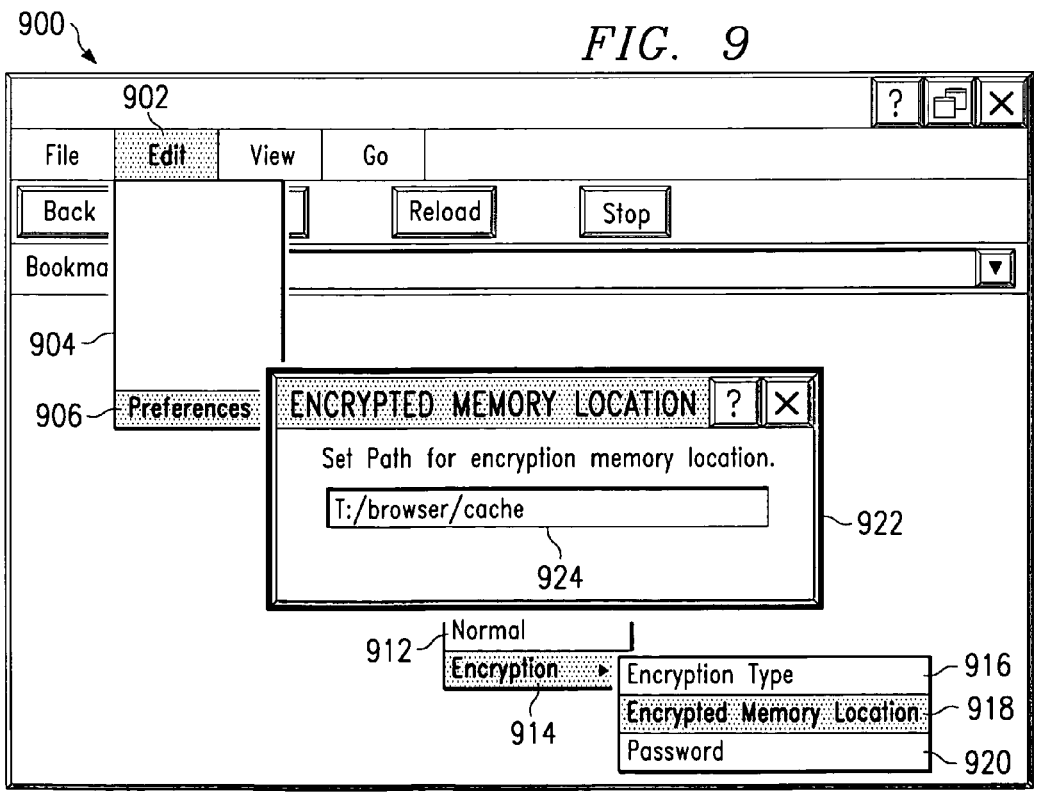

METHOD AND SYSTEM FOR ENCRYPTION OF WEB BROWSER CACHE

BACKGROUND OF THE INVENTION

1. Technical Field

The present invention relates to the field of information storage technology. More particularly, the present invention relates to a means for prioritizing the storage of network nodes or web site addresses. Still more particularly, the present invention relates to a method and apparatus for designating certain nodes, links, or web addresses at the time of storage.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI) which allows a user to read hypertext by means of the GUI. The browser gives some means of viewing the contents of web pages (or nodes) and of navigating from one web page to another.

Examples of browsers for the World Wide Web (WWW) include: Netscape Navigator from Netscape Communications Corporation, 501 East Middlefield Road, Mountain View, Calif. 94043, U.S.A.; Microsoft Internet Explorer, based on NCSA Mosaic, available from Microsoft Corporation, Redmond, WA; NCSA Mosaic, first available from National Center for Supercomputing Applications in Urbana, Ill., U.S.A. and now affiliated with Netscape Communications Corporation, 501 East Middlefield Road, Mountain View, Calif. 94043, USA; Lynx, for use on cursor-addressable, character cell terminals or terminal emulators under Unix or VMS, developed by the University of Kansas, Lawrence, Kans.; and W3, a browser for Emacs, Extensible MACro System, a popular screen editor. Web browsers act as clients of remote web servers.

The WWW is a massive hypertext system that a computer user accesses using an information access apparatus such as a WWW browser computer application. The WWW browser application communicates with information provider apparatuses, such as WWW server computer applications, to obtain information and services in the form of web pages. These web pages are identified by unique Universal Resource Locators (URLs). Typically, a browser application provides bookmark capability for storing URLs for user-selected web pages. This simplifies the user's future access to these bookmarked web pages.

The background of the World Wide Web (WWW), WWW browser applications and Uniform Resource Locators, are well described by reference to the first chapter of Instant HTML Web Pages by Wayne Ause, Ziff-Davis Press, ISBN 1-56276-363-6, copyright 1995, pages 1–15, hereby incorporated by reference as illustrative of the prior art.

Although the invention applies to information access and information provider apparatus, WWW browser and WWW server applications are representative of the technology. As such, this application describes the invention within the context of a preferred embodiment utilizing WWW browser and WWW server applications.

As mentioned above, the WWW is a massive hypertext system. Thus, the information provided to a user often includes references to other related information. These references are via hypertext links. Activating these hypertext links often results in accessing completely different web pages (supplied from completely different WWW server applications on other computer systems) from the web page that contains the link. Thus, a user often follows many links to reach desired information or services.

Each node or web page visited by the user is stored in a browser defined memory or cache. The cache might be a memory cache for immediate access or a disk cache for less frequent or less immediate access. The browser defined cache is normally resident on the user's computer, but in the case of a net PC, it might be located at the server because of net PC's lack of resident RAM. Therefore, a list of the web sites accessed by the user is available for perusal by persons other than the user. The problem is especially acute with net PCs where the cache is not within the physical control of the user but held at a remote server location.

Even when the cache is physically located on the user's computer, the user cannot assume that the contents of the disk cache are safe from outside intrusion, much less secure if another user has access to the user's web browser. Anyone having access to the user's web browser cache could conceivably reconstruct a user's web searching activity and deduce the subject matter of the search. More importantly, every document or application opened using the web browser is potentially available to non-authorized users in the browser cache. Given the number of applications supported by a browser (especially a Java enabled browser), the potential for confidential information to be available in the browser cache is quite high. Not only web page identities and contents may be available from the browser cache, but also email correspondence, charts, data, and findings originally viewed using a web browser, and even information extracted from applications which run on a web browser. What is needed is a method for securing the contents of web browser cache, whether the cache is physically located locally on the user's computer or remotely at a server.

SUMMARY OF THE INVENTION

The present invention discloses a method and apparatus for storing information related to a navigational path for accessing network node addresses. A user normally logs on to a distributed network, such as the user's Internet service, using the user's unique login name and password. The user must then be authorized to write to and read from encrypted information stored in the browser defined cache. The browser cache may be defined as either system memory or disk memory. The user might be required to enter a second password. Information requested by the user is then encrypted, either as a browser function or as an application function of the memory portion defined by the browser. Once authorized by the browser, the user can both read and write to the encrypted information in the cache. Thus, as the user browses network nodes or web pages on a network, the pages are encrypted by the browser before they are cached. Information requested by the user and stored in the cache is first decrypted by the browser and then displayed by the browser.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 illustrates a browser for setting preferences for implementing a preferred embodiment of the present invention;

FIG. 9 illustrates a browser for defining an encrypted memory location in accordance with a preferred embodiment of the present invention;

DETAILED DESCRIPTION OF THE PREFERRED EMBODIMENT

Figure 1:
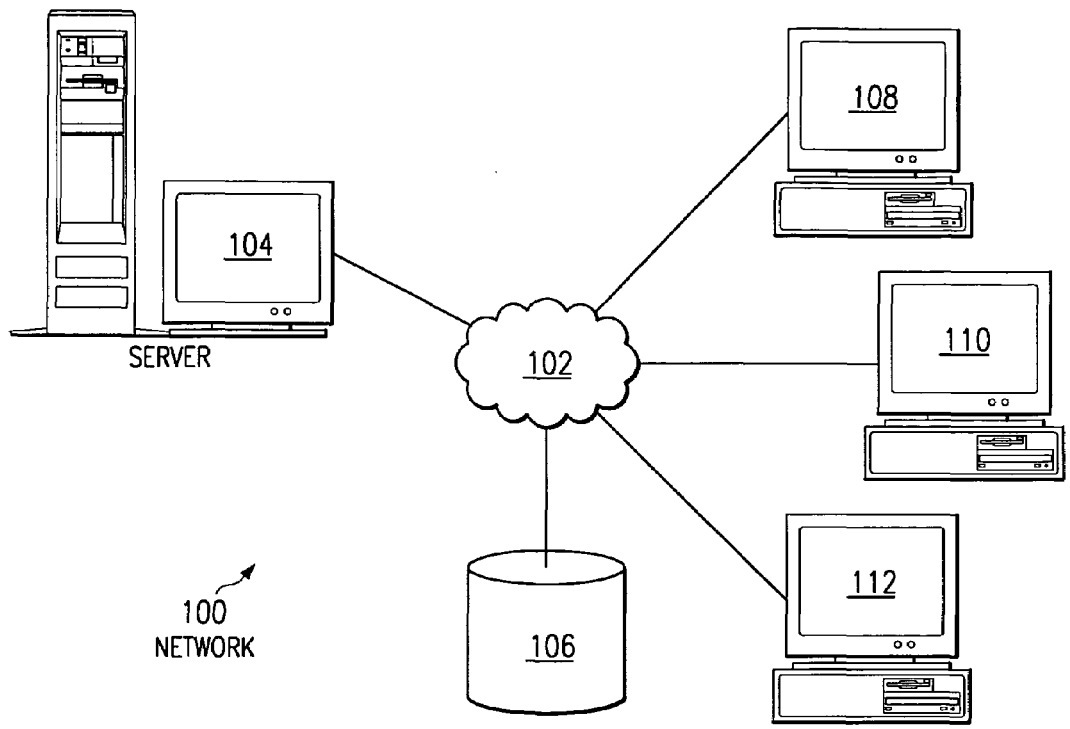
FIG. 1 depicts a prior art distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network which receives a program or other application from another computer coupled to the network. In the depicted example, server 104 provides data, such as boot files, operating system images, and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the transmission control protocol over internet protocol (TCP/IP) suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as an intranet or a local area network.

FIG. 1 is intended as an example and not as an architectural limitation for the processes of the present invention.

Figure 2:
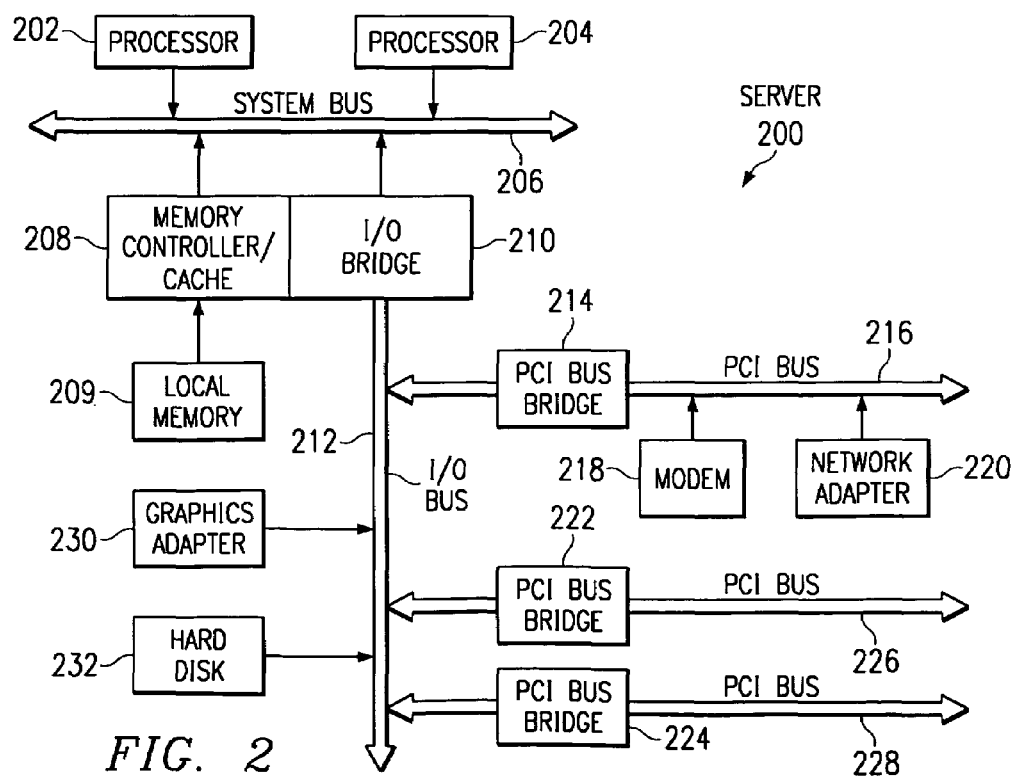
FIG. 2 is a block diagram illustrating a prior art data processing system that may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Modem 218 and network adapter 220 may be connected to PCI bus 216. Typical PCI bus implementations support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used, in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
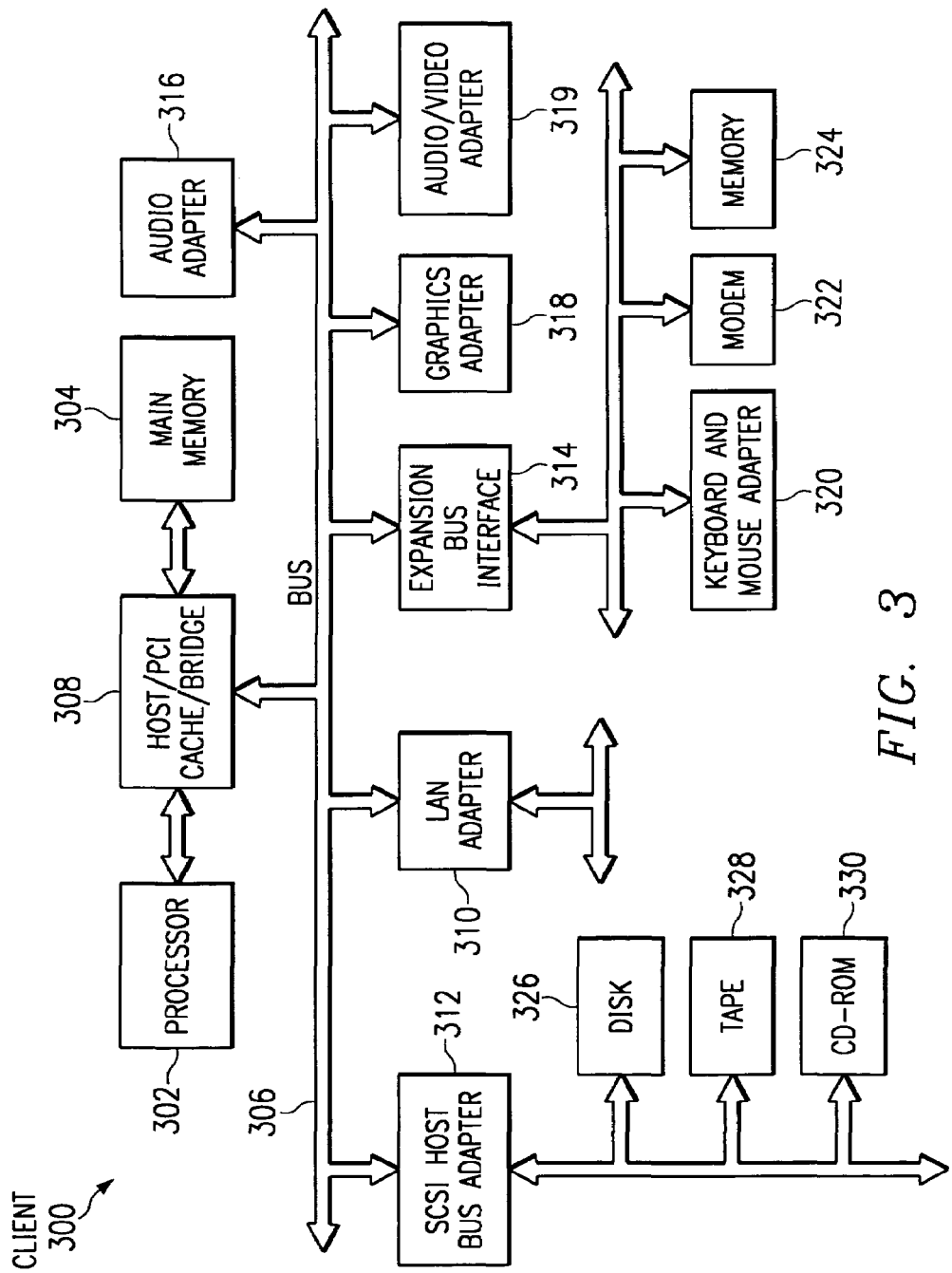
FIG. 3 is a block diagram illustrating a prior art data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations support three or four PCI expansion slots or add-in connectors.

In the present example, an operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system such as Java may run in conjunction with the operating system and provides calls to the operating system from Java™ programs or applications executing on data processing system 300. Java Text Markup Language (JTML) is an HTML-like language which enables users to use Java with the ease of using HTML for creating web pages. JTML is an integrated package of tools for the development of Java applets and user interfaces. It allows almost anyone with a need for online communication to create state-of-the-art applets without understanding Java programming concepts. JTML allows administrators to set up personal user accounts for authorizing users and to set up routines for automatically recording transactions between a JTML server and individual users. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
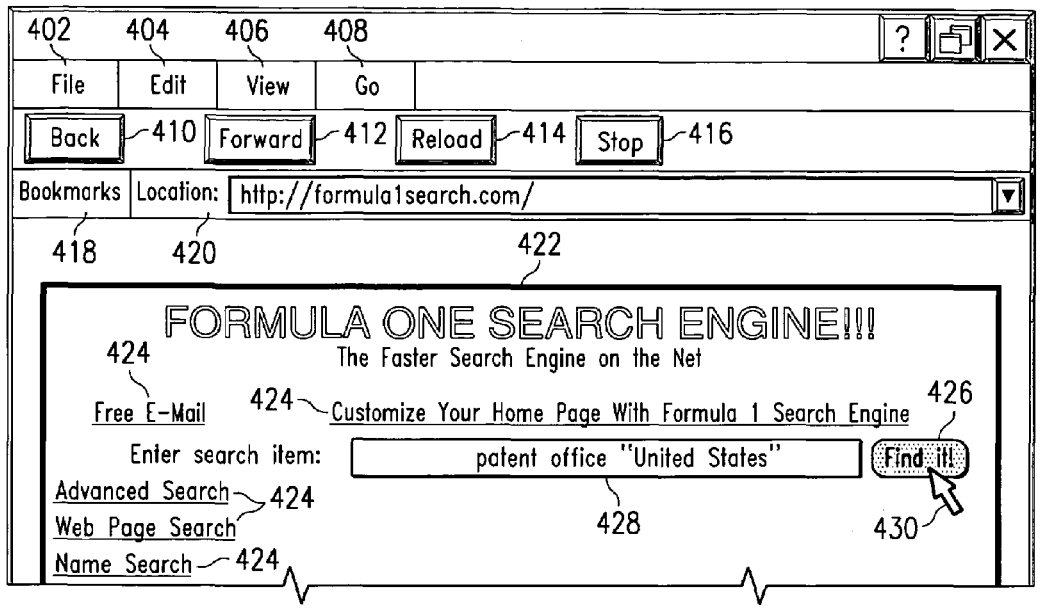
FIG. 4 illustrates a graphical user interface of a conventional browser.

FIG. 4 illustrates a graphical user interface of a conventional browser. Browser 400 may be used for implementing a preferred embodiment of the present invention. Browser 400 is an application that includes a graphical user interface, which allows a user to easily navigate through a node network, such as the World Wide Web. Essentially, browser 400 is a multi-function graphical user interface; but one of its most important functions is accessing web pages of a prescribed format, such as hypertext transfer protocol (HTTP). The graphical user interface of browser 400 consists of a number of menus, buttons, and text fields. Only the more important features of browser 400 are illustrated in this example. It is well known in the art that browsers consist of and are configured with many other features not shown in this example.

Buttons 402–406 are standard menu buttons on most application interfaces. By pressing file button 402, the user exposes a pull-down menu, which may include such features as open page capabilities, saving, routing, printing, and closing functions. Edit button 404 allows the user access to the browser's editing features, such as cut, paste, and copy operations, find operations, and searching operations. Pressing edit button 404 also normally exposes a preference option, which allows the user to select certain preferences or options associated with browser 400. View button 406 allows the user to configure the graphical user interface of the browser, including hiding or viewing certain tool bars, navigators, and buttons.

Go button 408, when pressed by the user, exposes a menu of navigation tools, such as forward, back, or home. By pressing the go button and selecting one of these features, the user navigates through a series of web pages or nodes which have recently been visited, or a home or start-up site, which is normally defined by the user in the preference selection of the edit button. Buttons 410–416 are also navigation buttons. In fact, the functions of button 410 and button 412 are normally found in the go button 408 menu.

Reload button 414 allows the user to reload the currently viewed page. This is a desirable option in the event of an error in loading, or when a web page is constantly being updated by the source but provides no automatic updating feature to the browser. Stop button 416 ends the loading process of the current web page, regardless of what portion of the page has been loaded (or not loaded) at the time stop button 416 is initiated.

Bookmarks button 418, when pressed by the user, exposes the bookmarks and edit tools needed to save and maintain a list of favorite web pages or network nodes identified by the user. Finally, location text field 420 allows the user to manually identify a web page by its unique address, allowing the browser to access the address identified in the text.

The present invention discloses a means for implementing direct linked selection of cached, previously visited links in nested web pages. As a user visits a web page, such as Formula One Search Engine™ page 422, in the conventional manner, the user has available numerous hypertext links embedded on the web page from which to choose. Links 424 illustrate hypertext links that were created by the web page creator. The user can quickly navigate to the web pages associated with hypertext links 424 by merely clicking on hot spots associated with the hypertext links, using pointer 430. Browser 400 then automatically navigates to the address of the web page associated with the hypertext link. In the example in FIG. 400, however, the user has entered a text string in search text entry field 428, rather than either jumping to another web page or manually addressing the web page in location entry field 420.

Figure 5:
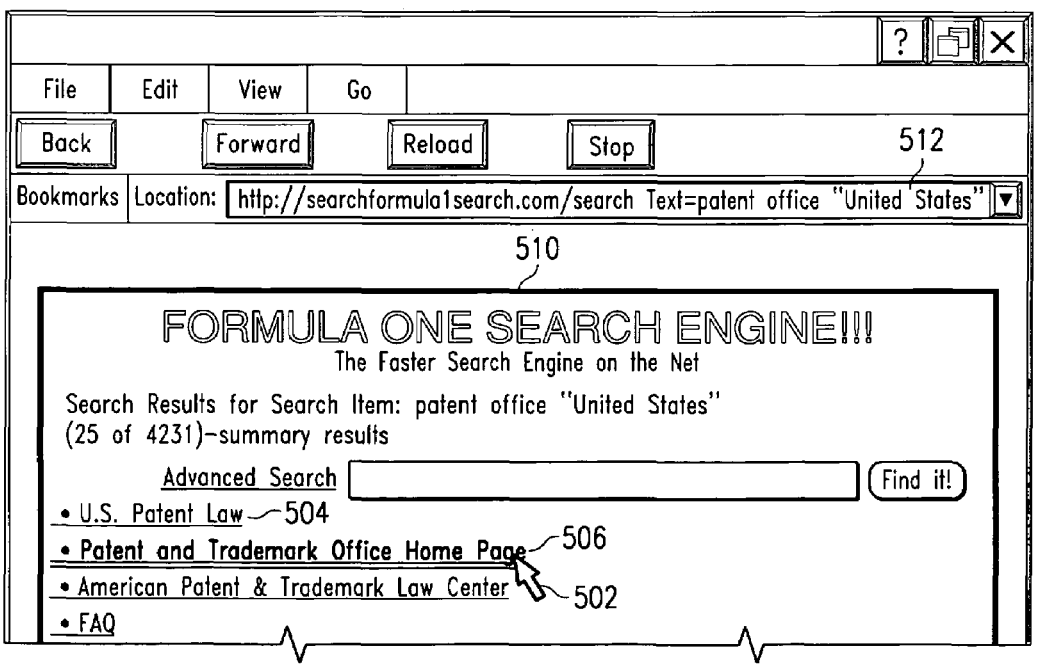
FIG. 5 illustrates a typical web page that might be expected as a result of the searching operation performed in FIG. 4.

FIG. 5 illustrates a typical web page that might be expected as a result of the searching operation performed in FIG. 4. Web page 510 depicts the Formula One Search Engine™ Results page, which displays the search results obtained from the search request performed by the user in FIG. 4. Web page 510 also contains embedded hypertext links, as described above. In this case, U.S. Patent Law link 504 provides a hypertext link for the user to immediately access information about U.S. patent law. The next link, Patent and Trademark Office Home Page link 506, provides a means for the user to immediately access the U.S. Patent and Trademark Office home page. In this case, the user has manipulated pointer 502 over link 506, thus activating the link. Activating a hypertext link usually entails clicking the mouse button or using an entry command. Note that link 506 differs in appearance from link 504 in that the characters of link 506 are bolder, and the underlining of the characters in link 506 is double rather than single.

Conventionally, a user is directed to links on a web page by the color or font characteristics of the characters in the text of the link. Typically, hypertext links in a web page are displayed in a predetermined color shade that is different from normal text, thus indicating an active but unused hypertext link. After activation, or after the link has been accessed once, the color of the link changes to a different color, indicating to the user that the web page associated with the link has been selected or opened at least once. Thus, the user is provided with an easy means of identifying hypertext links on a web page and also for discriminating between links that have been used and those that have not been used.

Note also on browser 500 that location field entry 512 displays the address of web page 510. In the example depicted in FIG. 5, the user has positioned pointer 502 over link 506, which provides a link to the Patent and Trademark Office home page. Executing an enter command (i.e., clicking the pointer) with pointer 502 positioned over link 506 causes browser 500 to jump to or open the page identified by the link.

Importantly, all of the information described above with respect to web page 510 is immediately cached in a browser defined memory location after receiving the user response for the web page. By saving once-visited web pages in a cache, the browser has available a ready supply of web pages which do not require Internet access for loading. Thus, the time required to load once-visited web pages may be reduced, because the browser is relieved of the responsibility for downloading each web page after each request. That is to say, some user requests are responded to with cached information.

A memory cache is most often defined as a small fast memory holding recently accessed data, designed to speed up subsequent access to the same data, and most often applied to processor memory access but also used for a local copy of data accessible over a network or the Internet using a web browser. When data is read from or written to main memory, a copy is also saved in the cache, along with the associated main memory address. The web browser monitors addresses of subsequent reads to see if the required data is already in the cache. If it is in the memory cache (i.e., a cache hit), the data is returned immediately from memory cache, and the main memory read is aborted or not started. If the data is not cached (i.e., a cache miss), then it is fetched from the network connection and also saved in the cache.

Generally, cache is further defined as a memory allocation of memory addresses from a RAM memory cache or the like. However, because of the time needed for accessing and loading web pages from the Internet, conventional browsers define cache as both memory allocated cache and also cache allocated on a hard disk drive. A recently visited web page can be cached either in system memory or disk memory.

The present invention enables both system memory and disk memory embodiments. Upon receiving a web page request, the browser first checks the memory cache for a requested web page. If the requested web page has been visited during the current session, and that visit occurred recently enough that the web page has not been overwritten by more recently visited web pages, a cache hit occurs and the web page contents are loaded from memory cache. If a cache hit does not occur, the browser checks disk caches for the requested web page. If disk cache is present, the web page information is loaded from the disk cache; if not, the browser loads the web page from the requested web site on the Internet.

Browser cache management is crucial to effective operation of a browser. Due to the difference in transfer rates between the browser and the Internet connection, and between the browser and the onboard memory or hard drive memory, browser operation is most effective when the contents of requested web pages are loaded directly into browser defined cache. This enables subsequent web page requests to be handled by loading the requested web pages from cache rather than from the web site on the Internet.

By managing browser cache in this manner, users are not subjected to enormous amounts of idle time, waiting for web pages to be loaded from an Internet connection. Nonetheless, even moderate browsing generates vast amounts of data associated with recently visited web pages. Browser operation may be impeded if the browser is searching reams of cache memory for a cache hit after each request. Therefore, most conventional browsers allow a user to select predefined cache limits in both memory cache and disk cache.

In a preferred embodiment of the present invention, encryption options for both memory cache and disk cache may also be set by the user. As a result, when the memory limit is reached, the oldest data is overwritten with more current web page contents. Therefore, the amount of memory allocated to memory and disk cache remains manageable.

Another problem is that of sensitive data being cached by a web browser, and this problem remains an issue with current browser technologies. Users often request sensitive or private information from web sites. With the advent of more secure encryption means, the Internet is quickly becoming the distributed network of choice for financial institutions, government agencies, and professional groups. As a user accesses a web site that provides sensitive data, the user generally must present valid user identification and a password before being granted access to the requested data. The data is then usually encrypted and sent to the user's browser.

When the requested page is loaded onto the user's computer by the browser, a breakdown in security occurs. This happens because the requested data which was handled as privileged data by the web server is now treated as any other data by the web browser, without regard to its sensitive nature. Sensitive data, or rated data, is given no more consideration by the web browser than any other type of data. Therefore, anyone having access to the user's browser may access the entire contents of the browser's cache. Any sensitive, important, rated, business or technical data stored in the browser cache may be accessed without user or password identification.

The problem becomes even more acute for network PCs that have little onboard memory and/or no disk memory, necessitating the allocation of browser cache from server memory. Anyone with access to the server may also have access to the user's browser cache store on the server.

Figure 6:
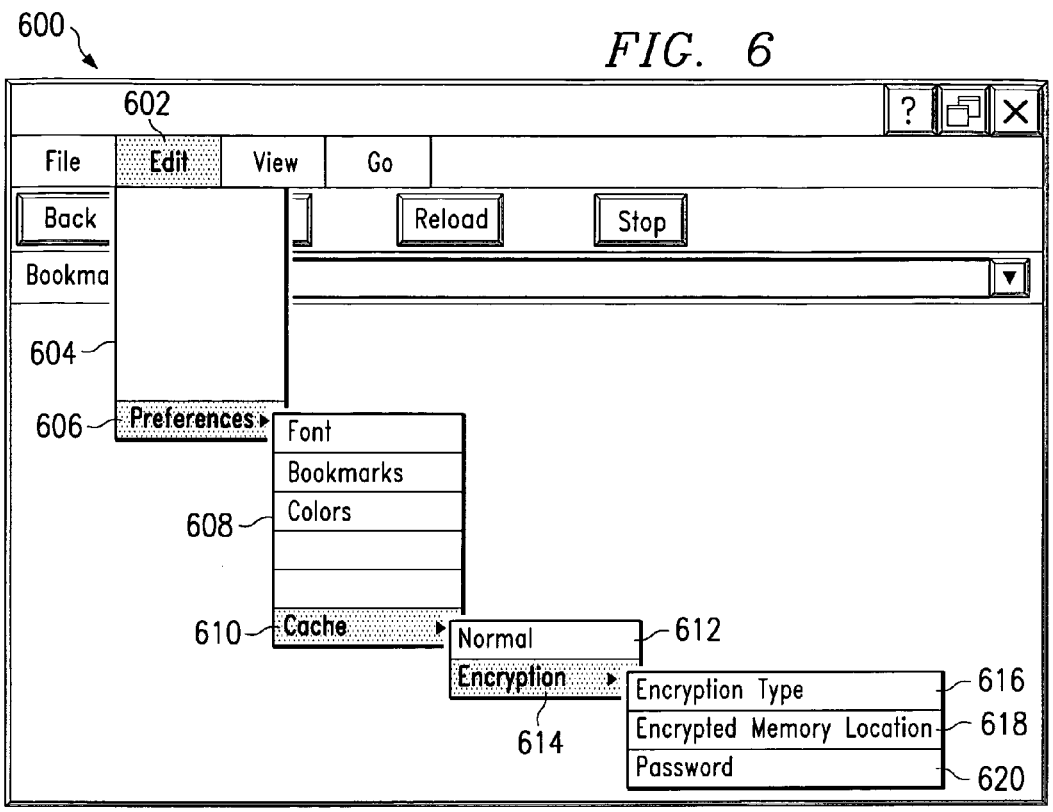
FIG. 6 illustrates a conventional browser for implementing a preferred embodiment of the present invention, specifically for selecting preferences related to the caching of web pages.

FIG. 6 illustrates a conventional browser for implementing a preferred embodiment of the present invention, specifically for selecting preferences related to the caching of web pages. Browser 600 contains many of the features discussed above with respect to FIGS. 4 and 5, which will not be discussed again.

In selecting preference options, the user expands drop down menu 604 by activating edit button 602. One of the selections in drop down menu 604 is preferences option 606. Note that the user has selected preferences option 606, as indicated by its highlighted state. Activating preferences option 606 results in a second menu expansion, in this case, preferences menu 608. Preferences menu 608 contains a number of preference choices available to the user for selection, allowing the user to configure options related to those topics.

In this case, the user has selected cache button 610. By selecting cache button 610, the user has available a number of preference options related to the browser-defined cache. Those preference options may include the amount of both memory cache and disk cache available to be defined by the browser, and may also include such things as expiration dates which, when selected by the user, automatically delete information stored to cache on a certain date or at a certain time.

In a preferred embodiment of the present invention, the options available to the user under cache button 610 are normal option 612, and encryption option 614. In this case, the user has selected encryption option 614, which expands yet another level of options. The options available for cache encryption are encryption type 616, encrypted memory location 618, and password 620.

Figure 7:
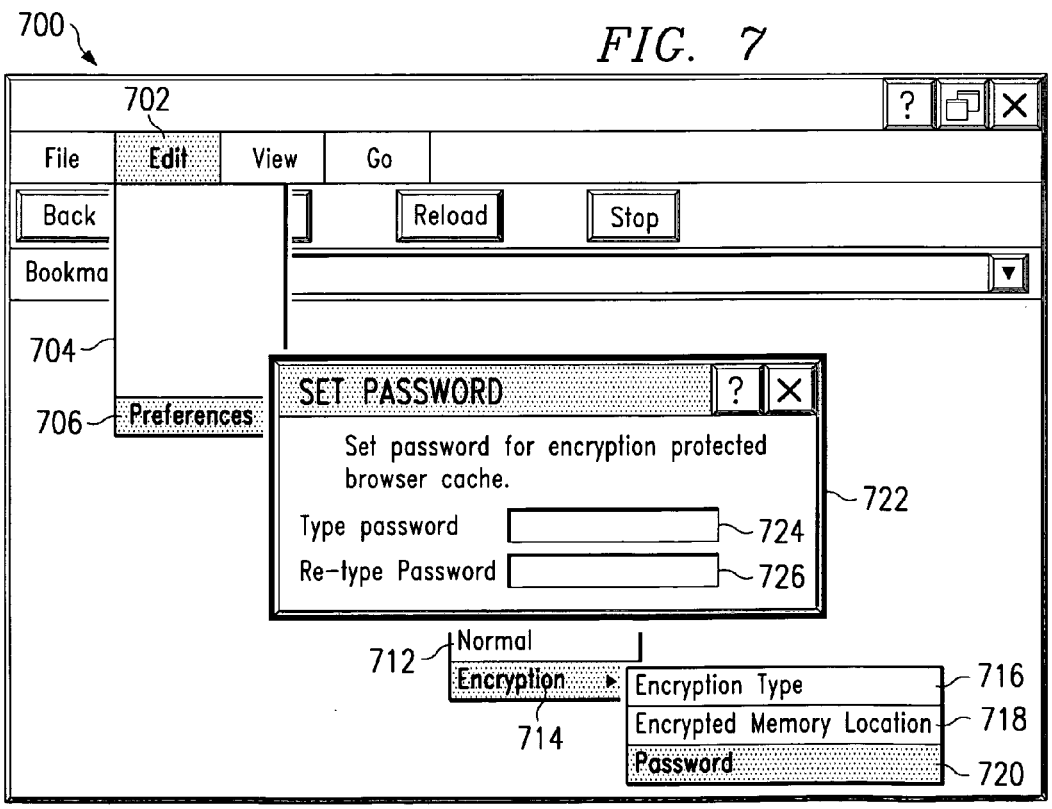
FIG. 7 illustrates a browser for implementing a preferred embodiment of the present invention, for setting a browser-defined password.

FIG. 7 illustrates a browser for implementing a preferred embodiment of the present invention, in this case, for setting a browser-defined password. In this example, browser 700 is opened to the same level as browser 600 in FIG. 6, in that edit button 702 has been selected by the user, exposing expanded menu 704. As in FIG. 6, expanded menu 704 contains preferences option 706. From preferences option 706, the cache option has been selected, exposing another layer of options, including normal cache option 712, and encryption cache option 714. By activating encryption option 714, the user has expanded the encryption options to include encryption type 716, encrypted memory location 718, and password 720.

Note that in browser 700, the user has activated password option 720, which automatically opens password dialog box 722. Password dialog box 722 is a standard box for allowing a user to set a password by typing a password in password field 724 and retyping the password in re-type password field 726. Browser 700 responds by confirming the password, and the browser's cache is thus protected by the password.

FIG. 8 illustrates a browser for setting preferences for implementing a preferred embodiment of the present invention. Browser 800 has been opened to the same level as browsers 600 and 700. However, the user has selected encryption type 816 for making user-defined preference selections.

In response to the selection of encryption type 816, the browser opens set encryption type dialog box 822. Set encryption type dialog box 822 contains a number of encryption types that are supported by the browser and also supported by specific encryption applications. When the user makes a selection, the user is not only defining the type of encryption to be performed on the information being stored in cache; but also, the user is defining which application, either the browser or separate encryption application, will actually encrypt the information to be stored in cache. The options listed in set encryption type menu 822 are merely exemplary and may contain any number of public domain or commercially available encryption types.

In the current example in FIG. 8, the user has selected the National Bureau of Standards DES data encryption standard as the type of encryption to be used for the information to be cached. The user has also selected the browser password as the password for decrypting the encrypted information in cache, as indicated by the highlighted state of use browser password option 826. Other encryption options are public-key encryption 828, and encoded file folder 832. Both National Bureau of Standards option 824 and public-key encryption option 828 are encryption functions performed by the browser. A conventional browser would have to be modified in order to perform these functions.

Encoded file folder option 832 is an encryption function that is handled by a separate encryption application. This encryption application is sometimes known as an installable file system. These applications are well known in the art and are normally used to sub-divide disk memory into separate encrypted partitions using an encryption application and non-encryption partitions. One such system is the Stacker Disk Compression Utility available from Microsoft Corporation in Redmond, Wash. The cache directory for the browser is contained in a portion of the disk, and only important information needing encryption is sent to the disk partition that supports information encrypting. Less sensitive information is passed directly to a hard drive without encryption, thus saving time and reducing the amount of time required to save the information.

Returning to set encryption type dialog box 822, both public-key encryption option 828 and encoded file folder option 832 give the user the option of using the browser password as the means for authenticating the user, as indicated by use browser password buttons 830 and 834, respectively.

FIG. 9 illustrates a browser for defining an encrypted memory location in accordance with a preferred embodiment of the present invention. Browser 900 contains many of the features explained above with respect to browsers 400 through 800. Therefore, these will not be described again.

In FIG. 9, the user has selected edit button 902, exposing expanded menu 904, from which the user has selected preferences option 906. Preferences option 906 further expands the cache preference options to include normal option 912, and encryption option 914. Again, encryption option 914 has been selected by the user. Encryption option 914 exposes the encryption options, including encryption type 916, encrypted memory location 918, and password 920.

In this case, the user has selected encryption memory location option 918. In response, the browser has displayed encrypted memory location dialog box 922. In this box the user defines the disk path for encrypted memory. In text entry box 924, the user has selected the path "T:/browser/cache" as the path for the encrypted information.

Therefore, when the browser caches or retrieves from cache any information, it will go to the disk location defined by the user in encrypted disk location dialog box 922. Importantly, this also sets the memory cache location for encryption locations other than the browser. If a user selects an encryption type from encryption type option 916 that is not supported by the browser, the user must direct the browser to the memory location supported by the encryption application. It is only when data is entered into a memory area supported by the encryption application that the data is encrypted by that application.

Data encrypted by the browser may be stored anywhere in files accessible to the browser. Therefore, the encrypted memory location need not be on the user's computer; it may actually be on a server. Thus, the present invention facilitates the use of browsers on non-network machines that contain little resident RAM and/or no disk storage capability.

Importantly, while this embodiment is primarily directed to disk storage applications, it must be understood that information being cached in random access memory (RAM) must also be encrypted. Conventionally, operating systems "page" memory. "Paging" is a technique for increasing available memory space by moving infrequently used parts of a program's working memory from RAM to a secondary storage medium, usually disk. The unit of transfer is called a page. The page may be stored in a number of memory areas for retrieval.

A problem occurs when browser cache is not immediately encrypted and, thus, the page resides in another part of the system, unencrypted. Therefore, both the browser memory cache and the browser disk cache must be considered for encryption.

Figure 10:
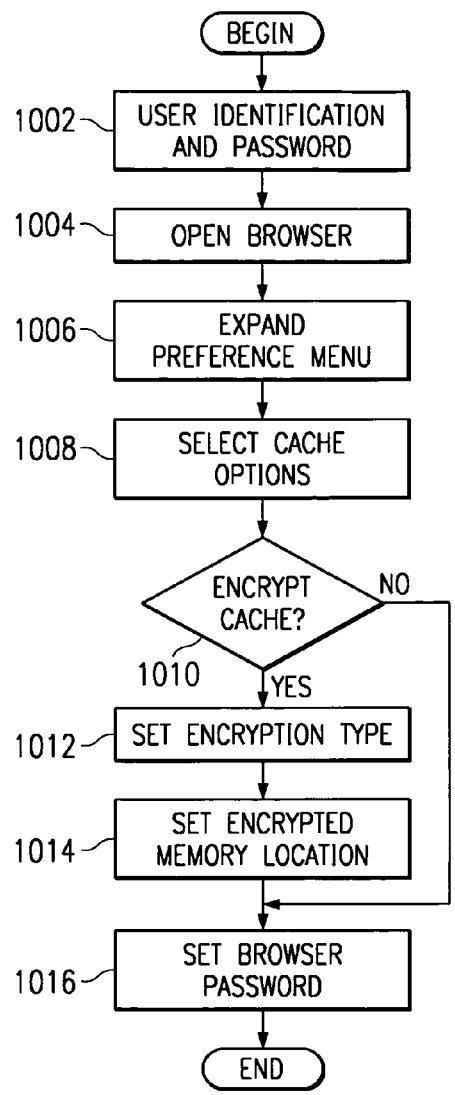
FIG. 10 is a flowchart depicting the process for selecting cache preferences in accordance with a preferred embodiment of the present invention.

FIG. 10 is a flowchart depicting the process for selecting cache preferences in accordance with a preferred embodiment of the present invention. The process begins when the browser receives the user identification and password (step 1002). Normally, the user identification and password authorize the user for the operating system rather than a specific application, such as a browser.

Once a user has been authorized to the operating system, the user may open the browser (step 1004). Upon opening the browser, the user expands the preference menu (step 1006). While the example in the present invention describes the user setting preferences through a GUI interface, preferences may be selected by a number of means which do not involve using the browser as the user interface.

Once the preference menu has been expanded, the user selects cache options (step 1008). The user then determines whether to encrypt information going into the cache (step 1010). If the user intends not to encrypt the information going to cache, the user may instead choose to select a browser password (step 1016). The browser would then be protected from intrusion by an unauthorized user.

However, the problem with protecting a browser is that the cache is not protected, and the information contained in the cache is not encrypted. Therefore, while an unauthorized user may not have access to the functions of the browser, the unauthorized user may peruse the cache with a second browser or a file manager of any type.

Returning to decision 1010, if the user intends to encrypt the cache, the user must set the encryption type at step 1012. As noted above with respect to FIG. 8, the browser may support a number of encryption types from which the user may select or may merely direct the information to an encryption application for encrypting the information accessed by the browser.

Next, the user sets the encrypted memory location (step 1014). As discussed above, defining memory location is extremely important in the case of encrypting information using an encryption application rather than a browser, because the information must be given a path to memory which is supported by that encryption application. On the other hand, information encrypted by the browser may be directed to any folder accessible to the browser.

Finally, the user may set a browser password (step 1016). In the present invention, setting a browser password not only protects the browser functionality, but also it protects the information stored in the cache from anyone attempting to access the information.

Additionally, the user may provide added security by setting a password for the encryption itself. In so doing, the user may protect the functionality of the browser with one password, and protect the encrypted information in the cache in the browser supported cache with a second password. In this manner, password features function similarly to public and private keys. A user with access to the browser may be able to write information to a cache that is encrypted; however, without the encryption password, the browser cannot decrypt information from the cache. Instead, it retrieves all information from the requested web site. This feature enables the user to allow others access to the user's browser while still retaining control over information in the user's cache.

Figure 11:
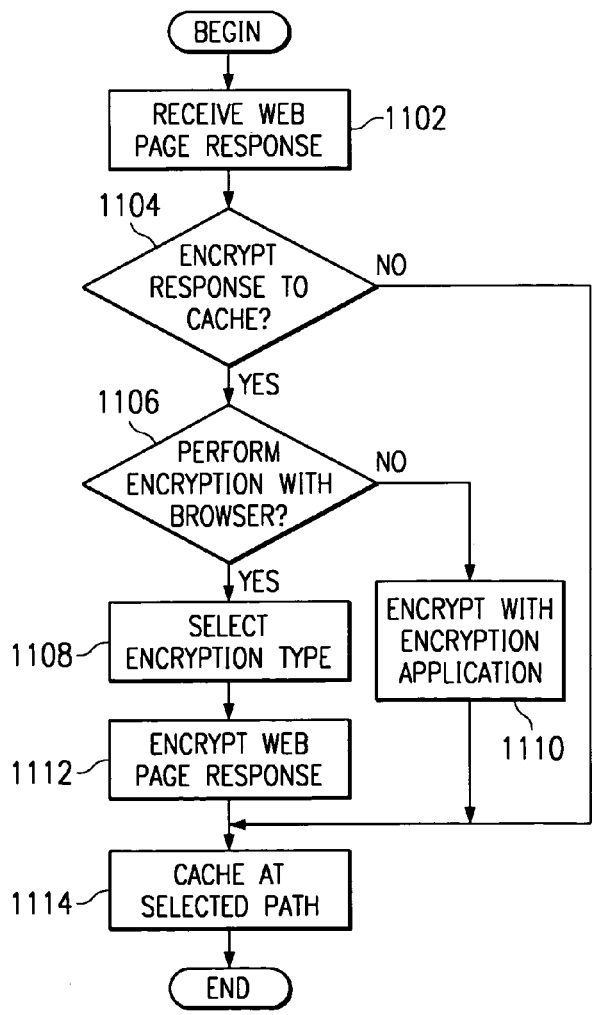
FIG. 11 is a flowchart depicting the browser-implemented task of storing encrypted information in accordance with a preferred embodiment of the present invention.

FIG. 11 is a flowchart depicting the browser implemented task of storing encrypted information in accordance with a preferred embodiment of the present invention. The process begins with the browser receiving a web page response (step 1102). The browser must determine whether to encrypt the response to a cache (step 1104). If the user has not selected encryption preference options as discussed above, the response information is merely saved to cache conventionally. The process then flows to step 1114, where the path to the browser-defined cache is determined, and the information is saved at that location.

However, if encryption preferences have been set by the user, the browser must first determine whether to use its own encryption support or an alternative encryption application. If the user has previously selected preference options selecting encryption to be performed by a separate encryption application, the data is encrypted with that application (step 1110). The data is then transported to the memory location supported by that encryption application (step 1114). In many applications, steps 1110 and 1114 are combined in a single step because, although a central memory location is supported by an encryption application, any data sent to the prescribed location is automatically encrypted by the encryption application. Thus, saving the data and encrypting the data are performed, more or less, simultaneously.

Returning to decision 1106, if the user has previously selected options enabling the browser to encrypt the information to be cached, the browser must select the encryption type corresponding to the user's encryption type selection (step 1108). The browser then encrypts the web page response with the selected encryption type (step 1112) and caches the encrypted information at the path defined by the user (step 1114). The process then ends.

Figure 12:
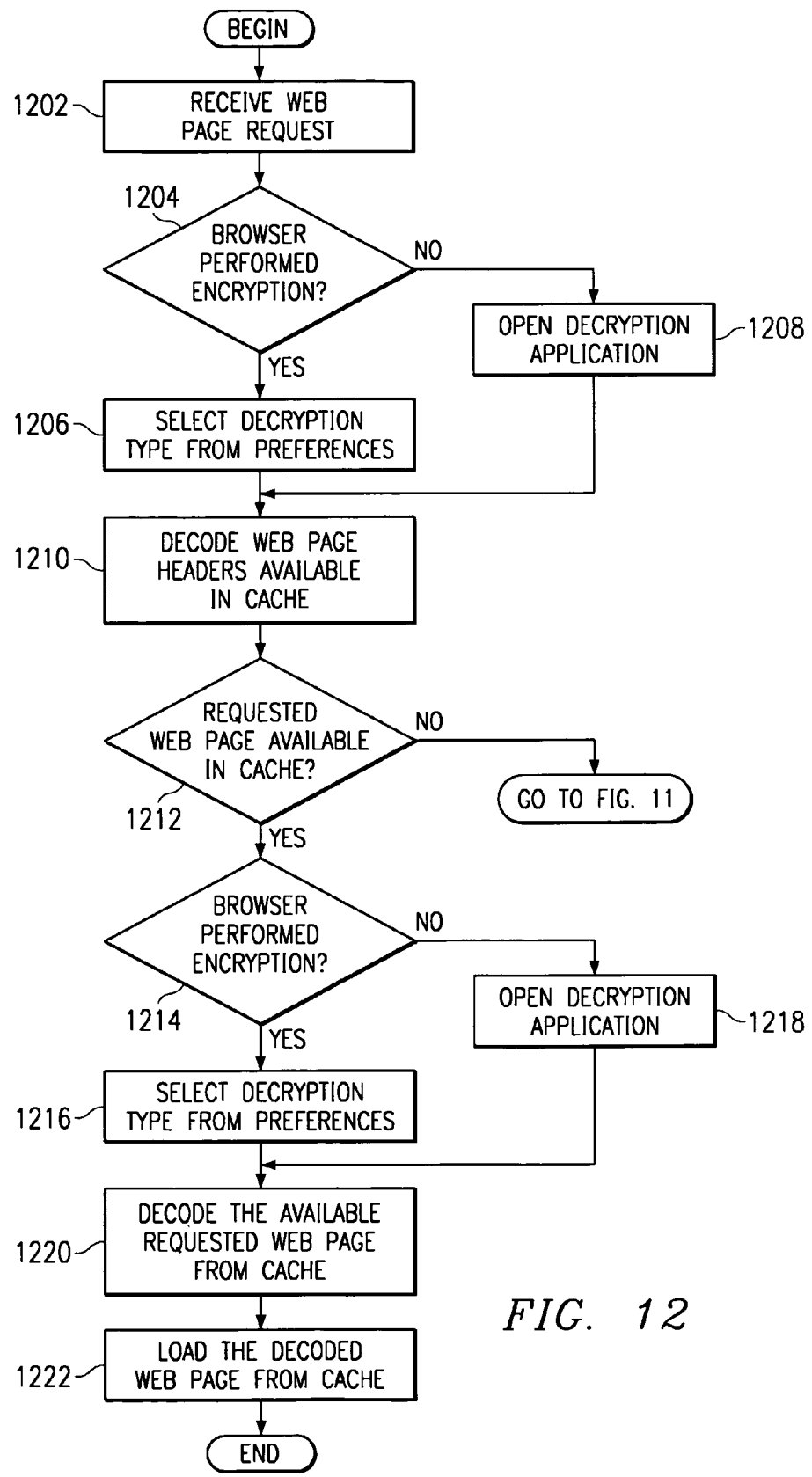
FIG. 12 is a flowchart depicting the process for retrieving data stored in cache, which may or may not have been encrypted when stored.

FIG. 12 is a flowchart depicting the process for retrieving data stored in cache, which may or may not have been encrypted when stored. The process begins with the browser receiving a web page request (step 1202). Normally, a browser determines if the requested web page is available in the browser-defined cache before attempting to access the web page from the Internet. However, in accordance with the present invention, the cache is encrypted and not available for reading unless that information is decrypted.

Therefore, when a web page request is received by the browser, the browser must determine if any browser encryption has been performed on the information available in the cache (step 1204). If the browser has performed the encryption, the browser selects the appropriate type of decryption from the preferences (step 1206). If not, the browser opens the decryption application (step 1208).

Once the browser has established the type and availability of decryption, the browser decodes the web page headers available in cache (step 1210). Because encryption and decryption, as functions, take more time than merely accessing the information, the web browser authorizes only the deciphering of web page headers, rather than entire web pages in cache, in order to reduce response time by the browser.

The browser then checks to see if the requested web page is available in cache (step 1212). If the web page is not available in cache, the browser accesses the information as described in the process depicted in FIG. 11. If the requested web page is available in cache, the browser must determine if the browser performed the encryption (step 1214). Performing the decision at step 1214 is redundant because the determination of decryption techniques and availability has been performed at step 1204. By merely retaining the results from step 1204, the browser need not again determine the encryption type or availability. However, decision 1214 proceeds similarly to decision 1204 in that, if the browser performed the encryption the decryption type is selected from the preferences originally set by the user (step 1216). Otherwise, the browser opens the decryption application (step 1218).

Next, the requested web page available in cache may be decoded (step 1220). Finally, the browser loads the requested web page that was available from cache (step 1222). The process then ends with the loading of the web page from cache.

What is claimed is:

1. A data processing implemented method for securing information stored in a browser cache associated with a browser, the method comprising:
   initiating a session with the browser;
   requesting a web page;
   receiving the web page;
   encrypting the web page using encryption provided by the browser for the browser cache; wherein the encrypting further comprises:
      presenting at least one browser implemented encryption method and at least one non-browser implemented encryption method;
      selecting one of the presented encryption methods; and
      performing the encryption of the web page using the selected method; and
   caching the web page.

2. The method recited in claim 1, wherein the step of encrypting the web page further comprises coding the web page using a browser supported encryption algorithm.

3. The method recited in claim 1, wherein the step of encrypting the web page further comprises coding the web page using an encryption application not supported by the browser.

4. The method recited in claim 1, wherein the step of encrypting the web page further comprises selecting a browser supported encryption algorithm from a plurality of browser supported encryption algorithms for encrypting the web page.

5. The method recited in claim 1, wherein the step of caching the web page further comprises providing a remote cache location.

6. The method recited in claim 1, wherein one of the browser and the browser cache is password protected from unauthorized users.

7. The method recited in claim 1, wherein the step of encrypting the web page further comprises defining a path for storing the web page that directs the web page to memory locations for encrypted data.

8. The method recited in claim 1, wherein web page information that is cached and then paged is paged as encrypted web page information.

9. A data processing implemented method for securing information stored on a browser cache, the method comprising:
   opening an application using a browser;
   performing an application specific function on the application using the browser, wherein application specific information is produced;
   encrypting the application specific information using encryption provided by the browser for the browser cache; wherein the encrypting further comprises:
      presenting at least one browser implemented encryption method and at least one non-browser implemented encryption method;
      selecting one of the presented encryption methods; and
      performing the encryption of the web page using the selected method; and
   caching the application specific information.

10. A data processing implemented method for securing information stored in a browser cache associated with a browser, the method comprising:
    initiating a session with the browser;
    decrypting data contained in the browser cache using decryption provided by the browser for the browser cache, wherein the decrypted data is associated with information content stored in the browser cache;
    requesting information stored in the browser cache;
    checking the decrypted data for requested information; and
    decrypting additional data contained in the browser cache using the decryption provided by the browser for the browser cache, wherein the decrypted data is the requested information.

11. A data processing system for securing information stored in a browser cache associated with a browser, the system comprising:
    initiating means for initiating a session with the browser;
    requesting means for requesting a web page;
    receiving means for receiving the web page;
    encrypting means for encrypting the web page using encryption provided by the browser for the browser cache; wherein the encrypting means further comprises:
       presenting means for presenting at least one browser implemented encryption method and at least one non-browser implemented encryption method;
       selecting means for selecting one of the presented encryption methods; and
       performing means for performing the encryption of the web page using the selected method; and
    caching means for caching the web page.

12. The system recited in claim 11, wherein the encrypting means for encrypting the web page further comprises coding the web page using a browser supported encryption algorithm.

13. The system recited in claim 11, wherein the encrypting means for encrypting the web page further comprises coding the web page using an encryption application not supported by the browser.

14. The system recited in claim 11, wherein the encrypting means for encrypting the web page further comprises selecting a browser supported encryption algorithm from a plurality of browser supported encryption algorithms for encrypting the web page.

15. The system recited in claim 11, wherein the caching means for caching the web page further comprises providing a remote cache location.

16. The system recited in claim 11, wherein one of the browser and the browser cache is password protected from unauthorized users.

17. The system recited in claim 11, wherein the encrypting means for encrypting the web page further comprises defining a path for storing the web page which directs the web page to memory locations for encrypted data.

18. The system recited in claim 11, wherein web page information that is cached and then paged is paged as encrypted web page information.

19. A data processing system for securing information stored on a browser cache, the system comprising:
- opening means for opening an application using a browser;
- performing means for performing an application specific function on the application using the browser, wherein application specific information is produced;
- encrypting means for encrypting the application specific information using encryption provided by the browser for the browser cache; wherein the encrypting means further comprises:
  - presenting means for presenting at least one browser implemented encryption method and at least one non-browser implemented encryption method;
  - selecting means for selecting one of the presented encryption methods, and
  - performing means for performing the encryption of the web page using the selected method; and
- caching means for caching the application specific information.

20. A data processing system for securing information stored in a browser cache associated with a browser, the system comprising:
- initiating means for initiating a session with the browser;
- decrypting means for decrypting data contained in the browser cache using decryption provided by the browser for the browser cache, wherein the decrypted data is associated with information content stored in the browser cache;
- requesting means for requesting information stored in the browser cache;
- checking means for checking the decrypting data for requested information; and
- decrypting means for decrypting additional data contained in the browser cache using the decryption provided by the browser for the browser cache, wherein the decrypted data is the requested information.

21. A computer program product on a computer readable medium for securing information stored in a browser cache associated with a browser comprising:
- initiating instructions for initiating a session with the browser;
- requesting instructions for requesting a web page;
- receiving instructions for receiving the web page;
- encrypting instructions for encrypting the web page using encryption provided by the browser for the browser cache; wherein the encrypting instructions further comprise:
  - presenting instructions for presenting at least one browser implemented encryption method and at least one non-browser implemented encryption method;
  - selecting instructions for selecting one of the presented encryption methods; and
  - performing instructions for performing the encryption of the web page using the selected method; and
- caching instructions for caching the web page.

22. The method recited in claim 1, wherein the browser cache includes both system memory cache and disk memory cache.

* * * * *